(12) United States Patent  (10) Patent No.: US 6,643,296 B1
Fukuhara  (45) Date of Patent: Nov. 4, 2003

(54) SYSTEM FOR CONTROLLING FRAME COLLISION

(75) Inventor: Yoshiyuki Fukuhara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/108,832

(22) Filed: Jul. 2, 1998

(30) Foreign Application Priority Data

Jul. 4, 1997 (JP) .............................. 9-179602
Feb. 9, 1998 (JP) ........................... 10-027479

(51) Int. Cl.[7] .......................................... H04L 12/413
(52) U.S. Cl. ...................... 370/445; 370/242
(58) Field of Search ................. 370/445, 338, 370/414, 437, 447, 461, 462, 465, 242, 245, 216, 229, 235, 252, 310, 328; 455/470, 403, 423, 434

(56) References Cited

U.S. PATENT DOCUMENTS

| | | | | |
|---|---|---|---|---|
| 5,012,467 A | * | 4/1991 | Crane | 370/445 |
| 5,379,290 A | | 1/1995 | Kleijne | 370/313 |
| 5,490,143 A | * | 2/1996 | Hara et al. | 370/447 |
| 5,657,326 A | * | 8/1997 | Burns et al. | 370/349 |
| 5,884,171 A | * | 3/1999 | Tanabe et al. | 455/434 |
| 5,940,400 A | * | 8/1999 | Eastmond et al. | 370/445 |
| 5,946,118 A | * | 8/1999 | Flaherty | 359/124 |
| 6,044,081 A | * | 3/2000 | Bell et al. | 370/401 |

FOREIGN PATENT DOCUMENTS

| | | |
|---|---|---|
| JP | 62-226741 | 10/1987 |
| JP | 3-278738 | 12/1991 |
| JP | 4-287445 | 10/1992 |

* cited by examiner

Primary Examiner—Douglas Olms
Assistant Examiner—Brian Nguyen
(74) Attorney, Agent, or Firm—Staas & Halsey LLP

(57) ABSTRACT

A system for controlling frame collision, enabling retry of transmission earlier and transmission of a data frame from the base station earlier, in a wireless LAN constituted by a base station connected to a cable LAN and a plurality of terminals for performing radio communication with the base station, where the terminal is provided with an adding means for adding a frame start code and a length to a tail of the data frame to be transmitted from the terminal to the base station and where the base station is provided with a collision detection means for recognizing the occurrence of collision when the frame start code and length remain without being destroyed in any of the data frames arriving simultaneously from a plurality of terminals.

20 Claims, 18 Drawing Sheets

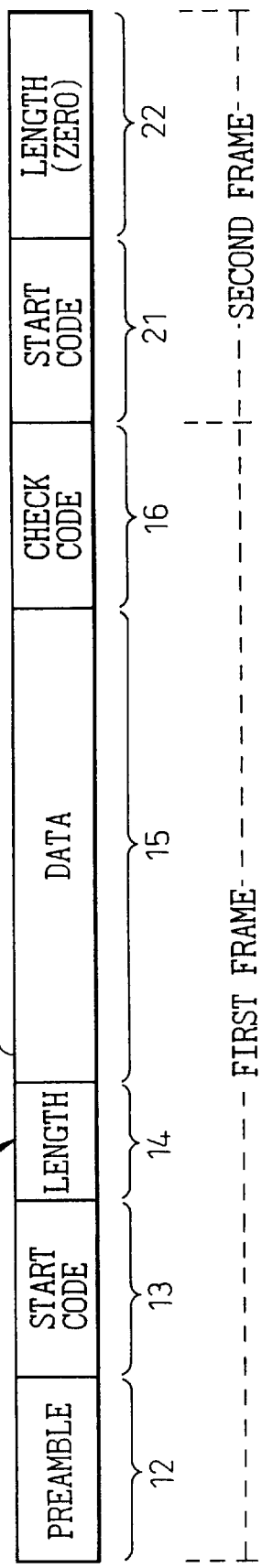
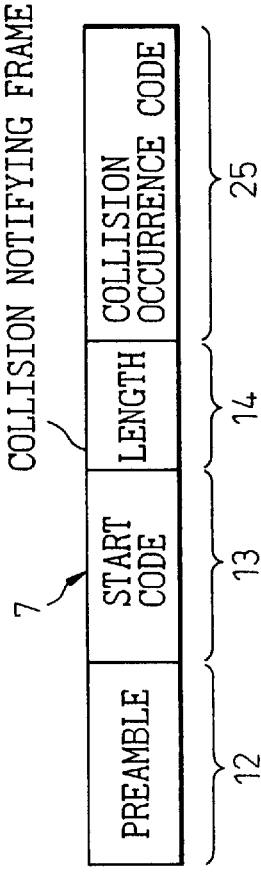
Fig. 5A
Fig. 5B

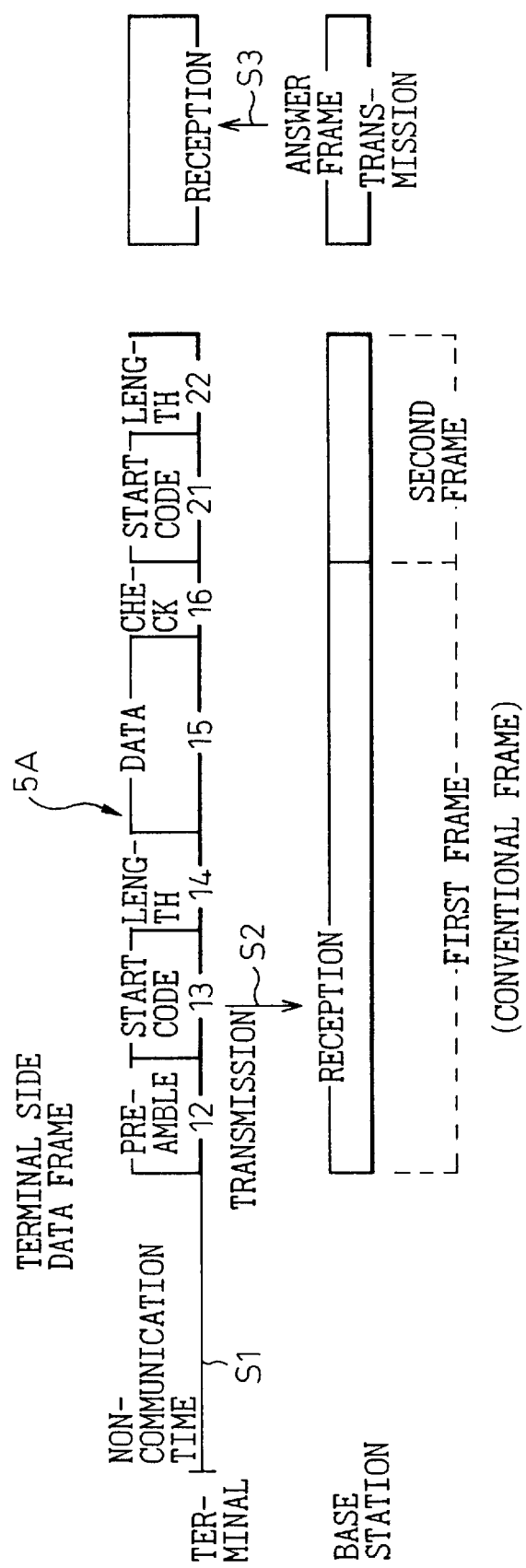

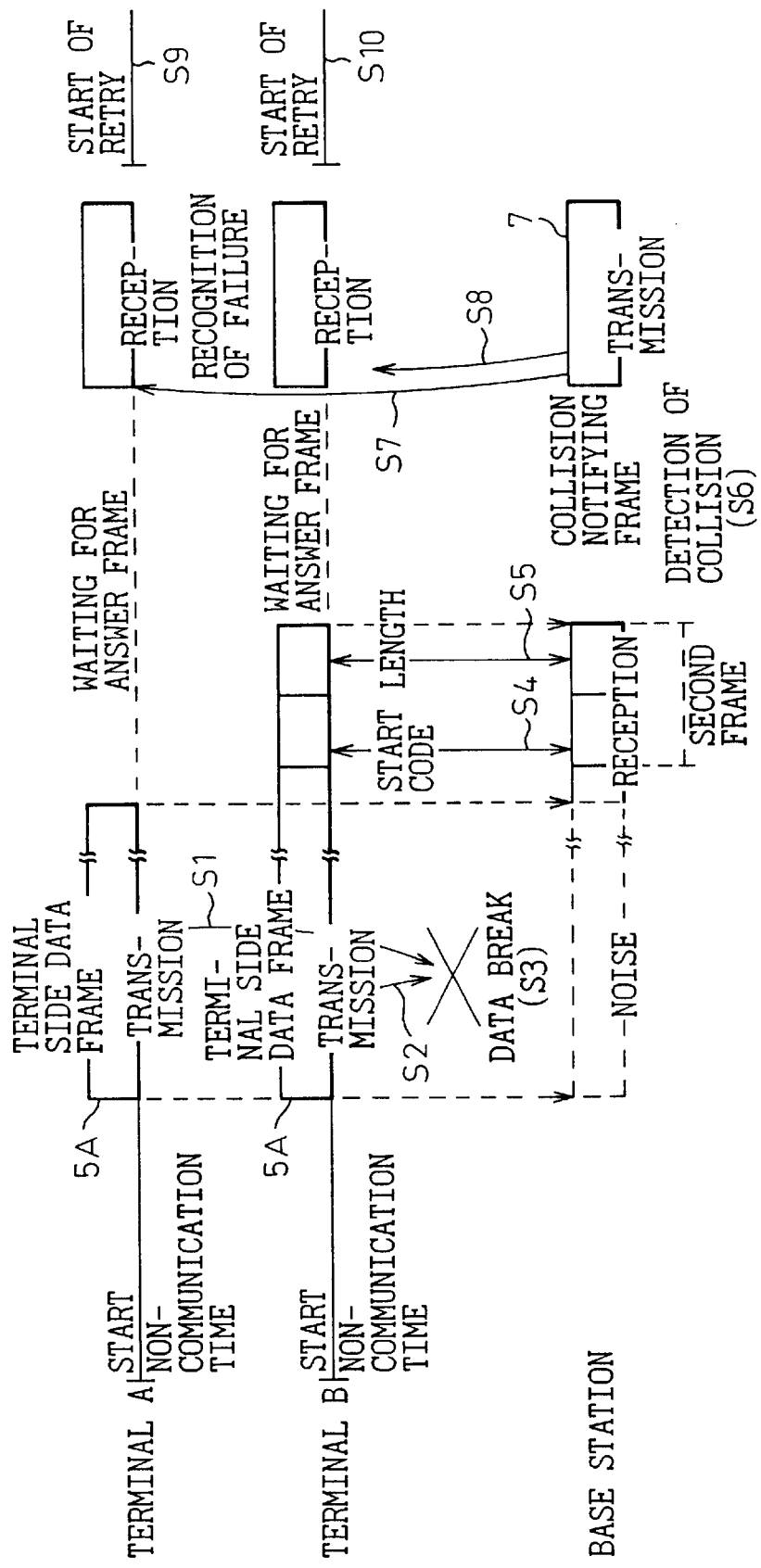

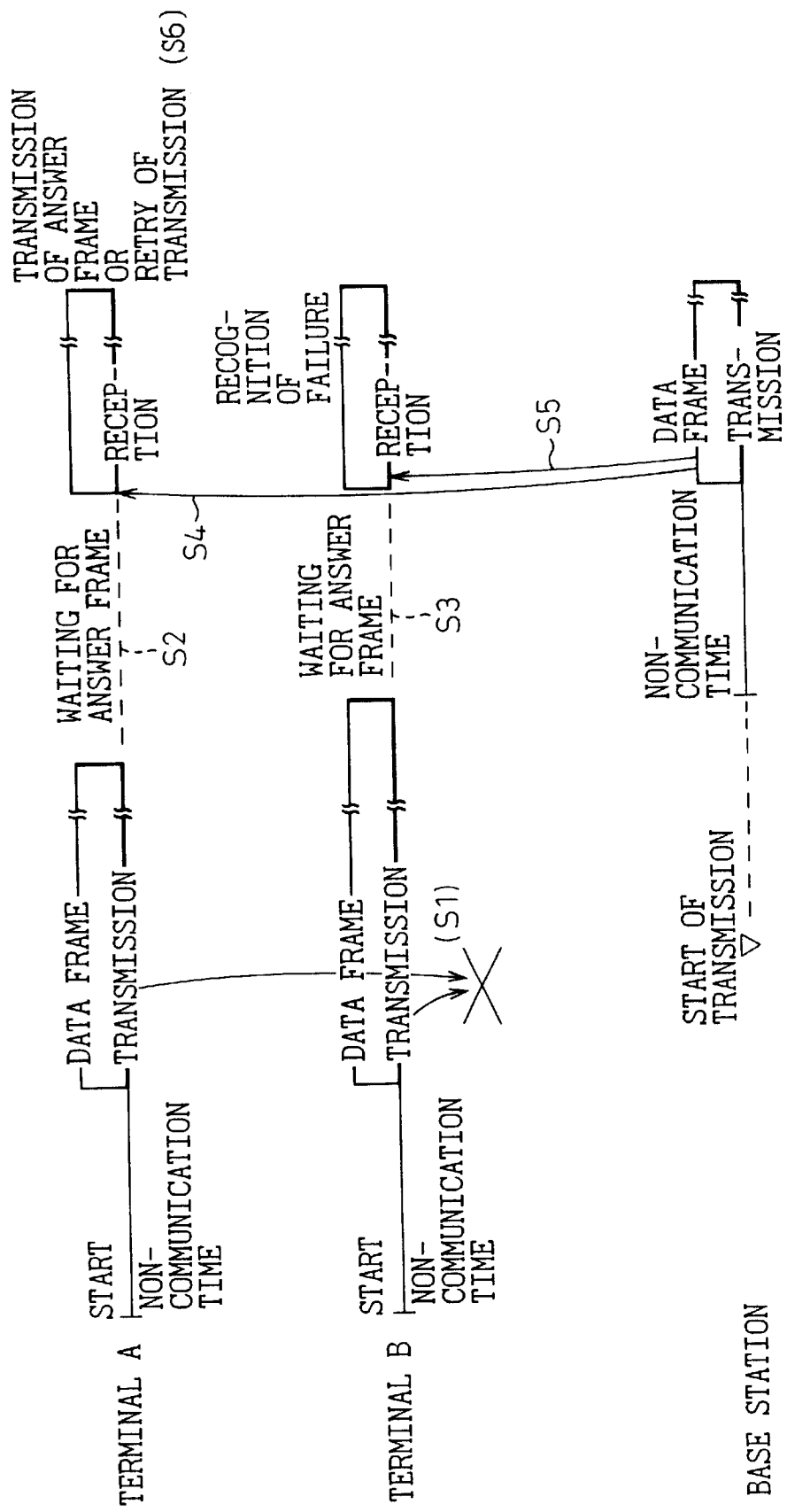

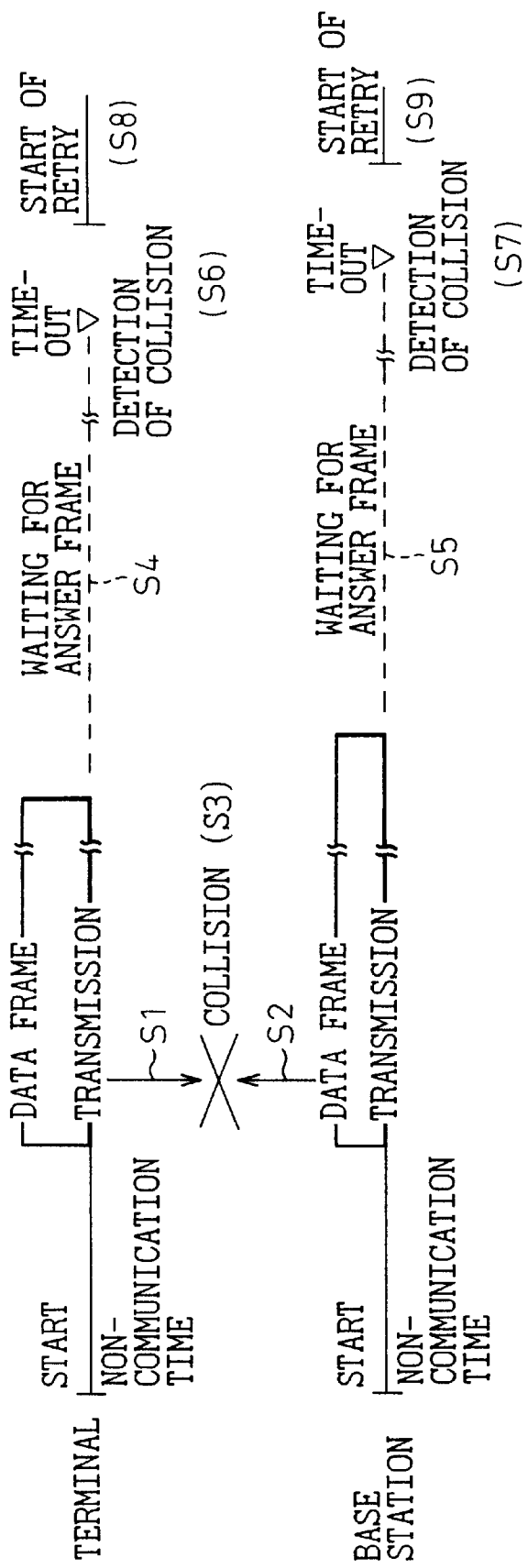

SYSTEM FOR CONTROLLING FRAME COLLISION

BACKGROUND OF THE INVENTION

1. Field of the Invention

The present invention relates to a system for controlling frame collision in a wireless local area network (LAN) constituted by a base station and radio terminals and to communication equipment for the same.

2. Description of the Related Art

In the protocol (CSMA/CA) used in a wireless LAN, when a transmission operation is commenced, a non-communication time of a certain constant time is detected to confirm that the base station or another terminal is not transmitting frames before the frames are transmitted. When a plurality of terminals simultaneously start transmission operations, however, frame collision occurs, the frames are destroyed, and the transmission fails. This makes it necessary to devise certain countermeasures to deal with such frame collision.

As will be explained in detail later by referring to FIG. 12 to FIG. 18, the system for controlling frame collision of the related art suffers from the problems that when frame collision occurs, a terminal can not retry transmission until a time-out of an answer frame and that when a base station starts a transmission operation during the frame collision, the base station cannot transmit frames until detecting the non-communication time after an end of the colliding frame.

SUMMARY OF THE INVENTION

Accordingly, in consideration with these problems, an object of the present invention is to provide a system for controlling frame collision enabling a transmission retry earlier and the transmission of data frames from a base station earlier.

To attain the above object, the present invention provides a system for controlling frame collision in a wireless LAN constituted by a base station connected to a cable LAN and a plurality of terminals performing radio communication with the base station, wherein each terminal is provided with an adding means for adding a frame start code and a length to a tail end of a data frame to be transmitted from the terminal to the base station and wherein the base station is provided with a collision detection means for recognizing occurrence of collision with respect to a terminal from the base station where the frame start code and length remain without being destroyed in any data frame when data frames simultaneously arrive from a plurality of terminals.

BRIEF DESCRIPTION OF THE DRAWINGS

These and other objects and features of the present invention will become apparent from the following description of the preferred embodiments given with reference to the attached drawings, in which:

FIGS. 5A and 5B are views of examples of the configuration of a terminal side data frame and a collision notifying frame of the present invention;

FIG. 6 is an explanatory view of the operation of a third embodiment of the present invention;

FIG. 7 is an explanatory view of the operation of a fourth embodiment of the present invention;

FIG. 17 is an explanatory view of the operation in a case where the base station starts the transmission operation during the frame collision; and FIG. 18 is an explanatory view of the operation where the frame of the terminal and the frame of the base station collide.

DESCRIPTION OF THE PREFERRED EMBODIMENTS

Before describing the embodiments of the present invention, the related art and the disadvantages therein will be described with reference to the related figures.

Figure 12:
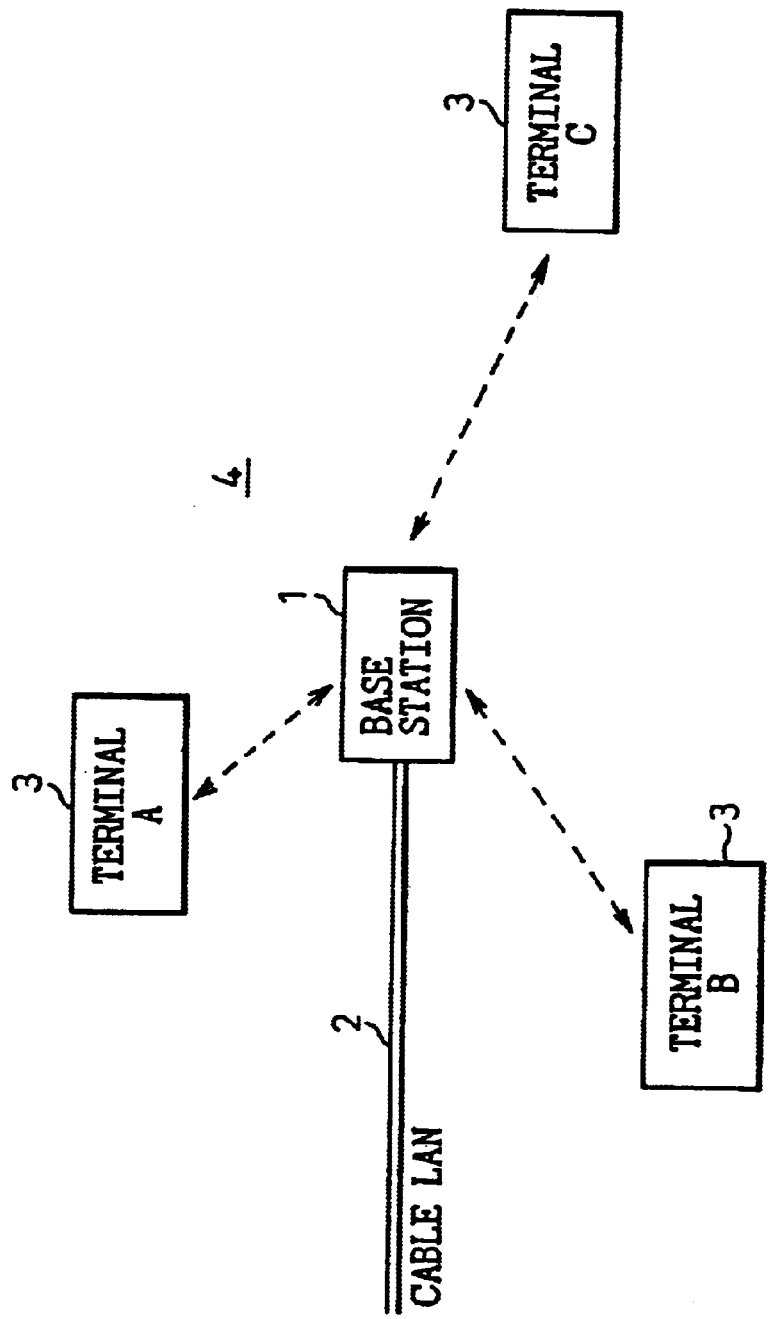
FIG. 12 is a view of an example of the configuration of a wireless LAN of the related art.

FIG. 12 is a view of an example of the configuration of a conventional wireless LAN. In the figure, 1 is the base station (also referred to as a radio base station); 2 is a cable LAN connected to the base station 1, and 3 are terminals radio communicating with the base station 1 and constituting a wireless LAN 4.

The base station 1 acts as relay equipment between the cable LAN and the wireless LAN, transmits the data frame received from the cable LAN 2 to a radio terminal 3, and transmits the frame received from a radio terminal 3 to the cable LAN 2. Terminal A, terminal B, and terminal C receive frames transmitted from the base station 1 and transmit frames to the base station 1.

Figure 13:
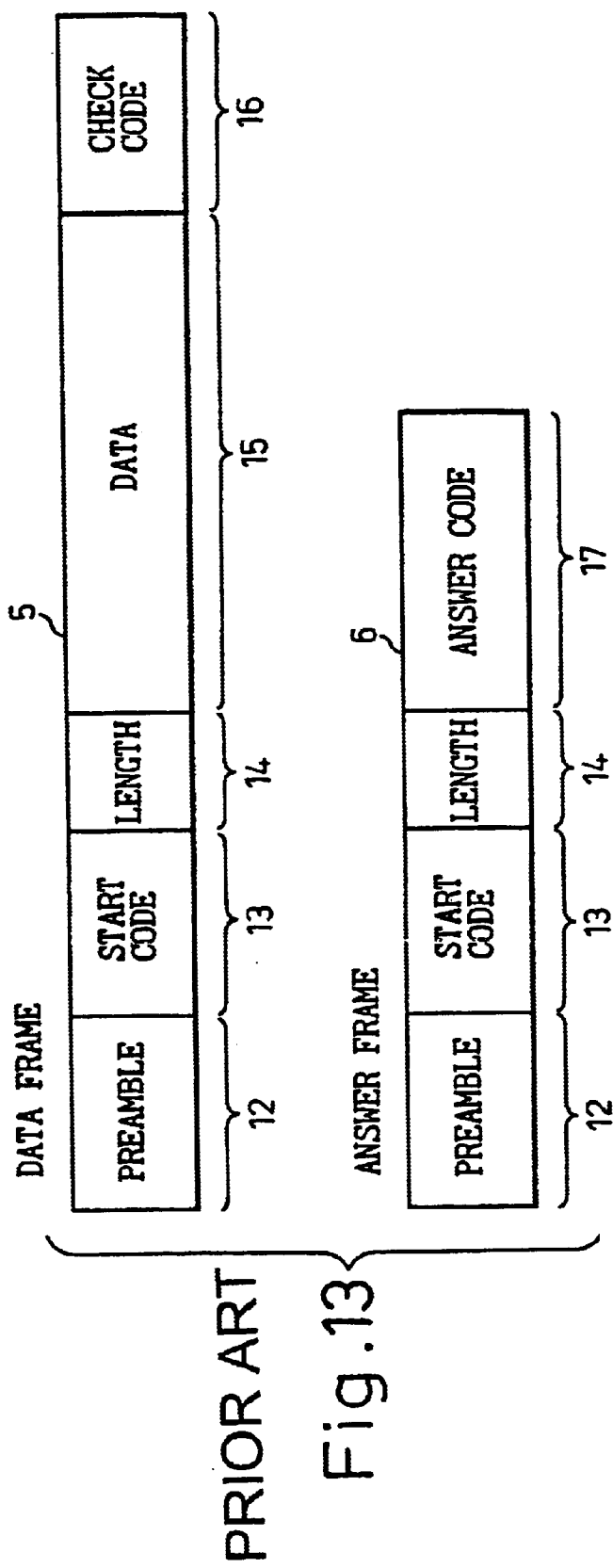
FIG. 13 is a view of examples of configurations of the data frame and an answer frame of the related art.

FIG. 13 is a view of an example of the configuration of the data frame and the answer frame of the related art. In the figure, reference numeral 5 is a data frame comprised of a preamble 12, a start code 13, a length 14, a data 15, and a check code 16. On the other hand, reference numeral 6 is an answer frame comprised by the preamble 12, start code 13, length 14, and an answer code 17. The data frame 5 is transmitted from the terminal 3 and received at the base station 1 or transmitted from the base station 1 and received at the terminal 3. The answer frame 6 is a frame by which the terminal or the base station 1 receiving a data frame notifies the sender of normal reception of the data frame.

The preamble 12 is bit synchronization guaranteeing data used for detection of the received signal, selection of an antenna diversity, stabilization of frequency, synchronization of reception bit timings, etc. Further, the start code 13 is used for recognizing that the received data is an available frame when the base station 1 and the terminal 3 receive the code.

The length 14 is information indicating the length of the data continued immediately after this, the data 15 is the body of the transmission data frame, and the check code 16 is the code for detecting an error of the data.

Further, in the answer frame 6, 17 is an answer code indicating that this frame is an answer frame.

Figure 14:
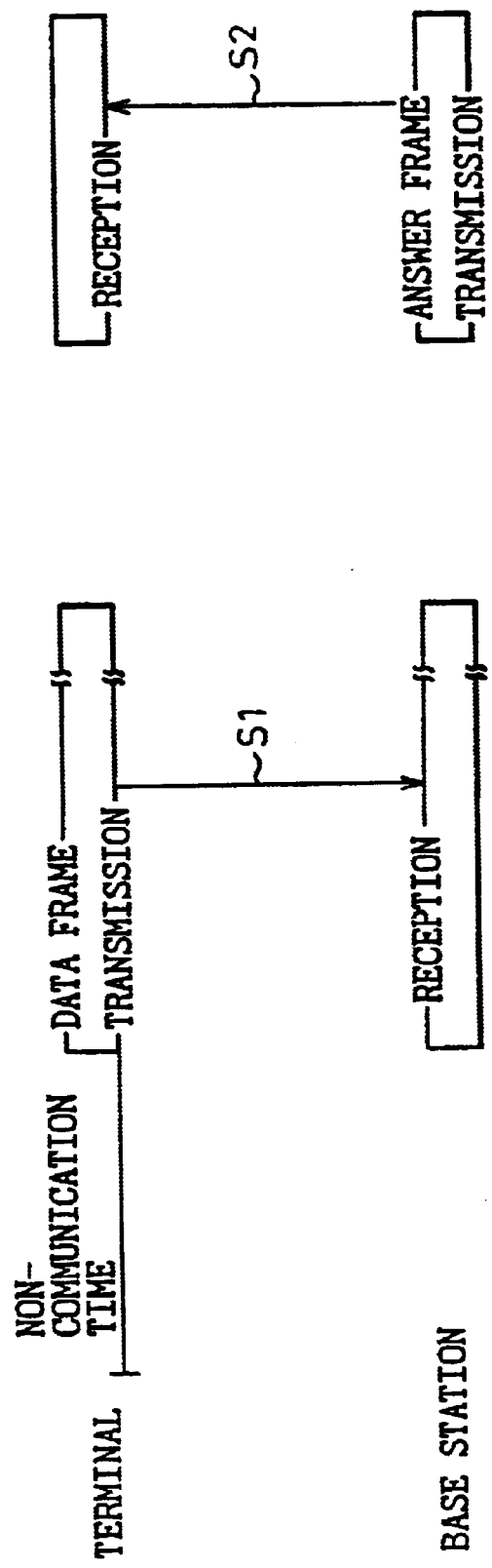
FIG. 14 is an explanatory view of a frame transmission operation between a terminal and base station of the related art.
Figure 15:
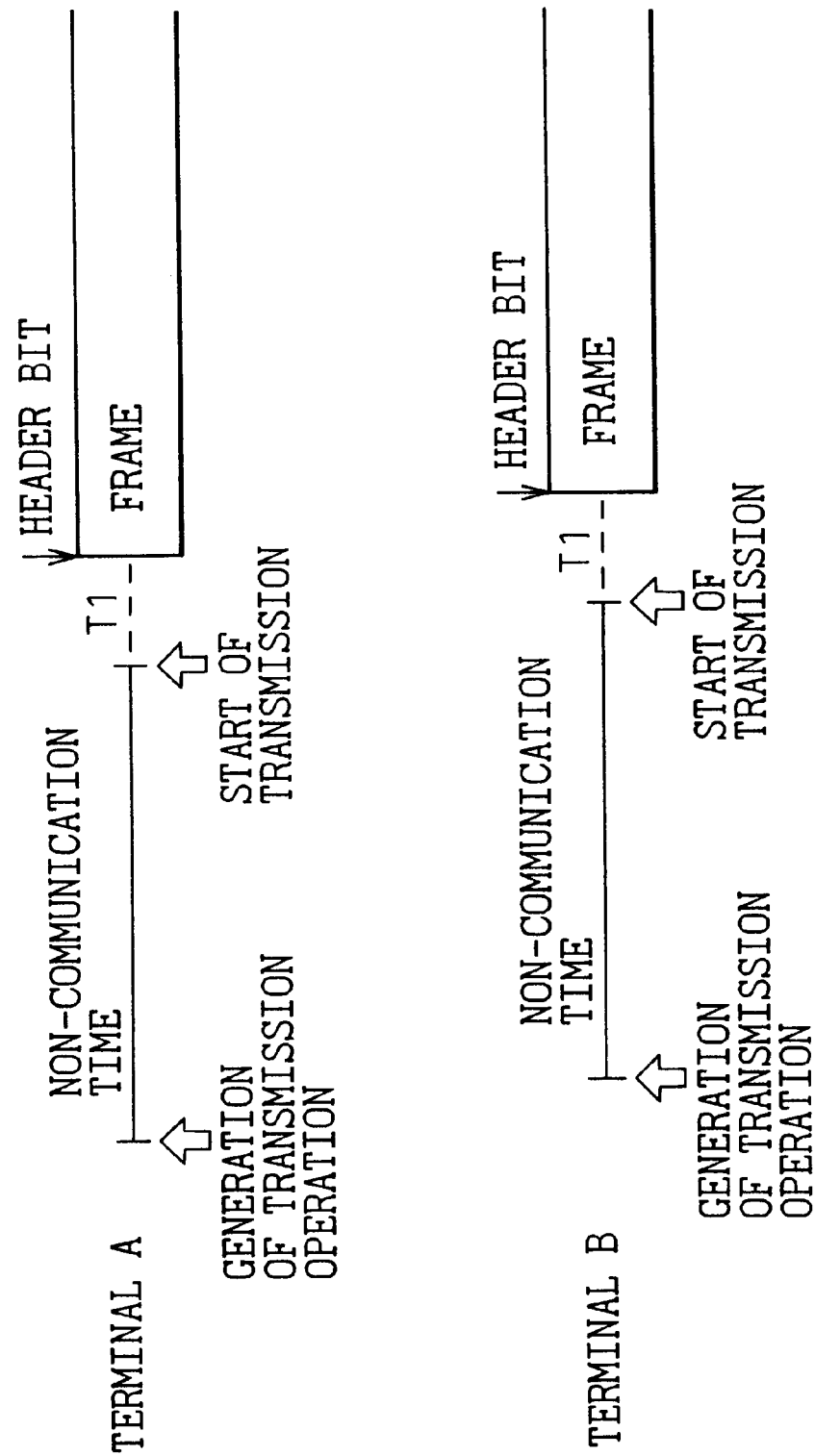
FIG. 15 is a detailed explanatory view of an occurrence of collision.

FIG. 14 is an explanatory view of the frame transmission operation between the terminal 3 and the base station. The terminal 3 detects the non-communication time of a certain constant time to confirm that the base station 1 or another terminal 3 is not transmitting a frame and then transmits the data frame (S1). The base station 1 receives the data frame and transmits an answer frame (S2). The terminal 3 receives the answer frame and ends the communication.

In this case, collision sometimes occurs since frames are simultaneously transmitted from a plurality of terminals 3. FIG. 14 is a detailed explanatory view of occurrence of collision. The terminal A and the terminal B usually independently operate, but assume that they substantially simultaneously perform transmission operations (the terminal B being slightly later) as illustrated at a certain timing. If a carrier is detected during this time, the transmission is suspended.

When it is confirmed that there is no carrier for a certain constant time (non-communication time), the transmission is commenced. At this time, an internal delay due to the circuit, wireless propagation, or the like occurs (T1 of the figure) until a header bit of the frame is actually transmitted in space. The term T1 is a delay time generated in circuit control, wireless propagation, etc. After this, it is no longer possible to stop the monitoring and transmission of the carrier.

For this reason, when the terminals simultaneously commerce transmission during the time T1, frame collision occurs since transmission cannot be stopped. In the figure, looking at the terminal B, despite the fact that the terminal A is transmitting a frame during the time T1, the terminal B can not suspend the transmission and therefore ends up performing the transmission resulting in collision. As described above, it is seen that collision occurs when transmission is carried out by a plurality of terminals and the base station during a time shorter than the time T1.

Figure 16:
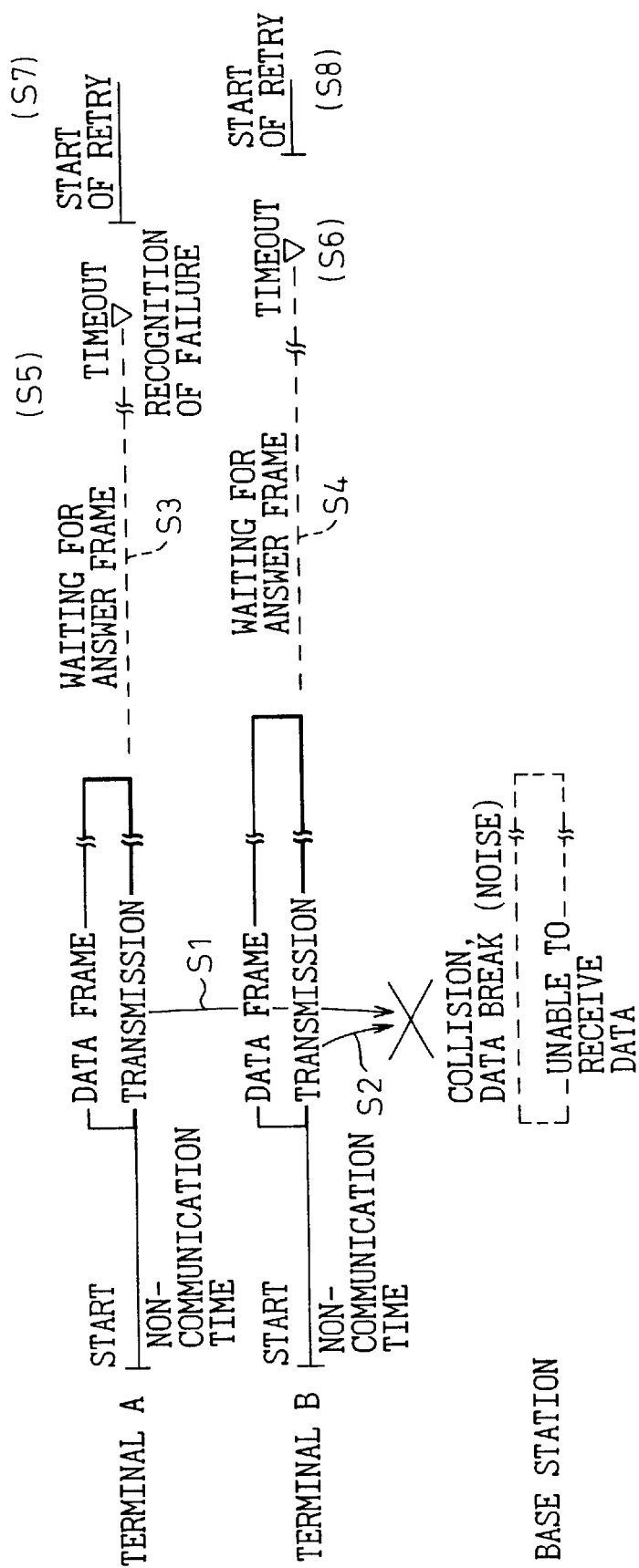
FIG. 16 is an explanatory view of a transmission retry operation by the terminal at the occurrence of frame collision.

FIG. 16 is an explanatory view of the transmission retry operation by the terminal 3 at the time of occurrence of frame collision in the related art. The terminal A and the terminal B simultaneously start the transmission operation of data frames (S1, S2). For this reason, both of the terminals 3 simultaneously detect the non-communication time and transmit the data frames resulting in frame collision at the base station 1 side and destruction of the frame data.

In this case, the base station 1 recognizes the colliding frames as noise, therefore cannot receive the original frame and does not transmit the answer frame. The terminals A and B wait for the answer frame (S3, S4) after transmitting the data frames, but since the time runs out without the transmission of the answer frame from the base station 1 (S5, S6), they recognized that the transmissions of the data frames failed and retry the transmission (S7, S8).

FIG. 17 is an explanatory view of the operation where the base station starts transmission during frame collision. When a frame collision occurs (S1), the frames are destroyed, therefore the base station 1 recognizes them as noise. The terminals transmitting the data frame wait for the answer frame (S2, S3). If the base station 1 starts a transmission operation during this time, the transmission operation is delayed since the noise is not considered non-communication time. It transmits the frame after detection of the non-communication time from the end of the colliding frames (S4, S5).

The terminal A and the terminal B enter into a state waiting for the answer frame after the transmitting their data frames, but since the data frame is transmitted from the base station 1, recognize that the transmission of the data frames failed. When the data frames transmitted from the base station 1 are addressed to the terminals A and B, they then transmit answer frames, while when they are not addressed to the terminals A and B, they retry transmission (S6).

FIG. 18 is an explanatory view of the operation in a case where a frame of a terminal and a frame of the base station collide. The terminal 3 and the base station 1 simultaneously start the data transmission operation (S1, S2). For this reason, the two simultaneously detect the non-communication time and transmit the data frames. As a result, frame collision occurs (S3) and the frames are destroyed. The terminal 3 and the base station 1 enter into the state waiting for an answer frame (S4, S5) after transmitting the data frames, but time-outs occur without their receiving answer frames, so they detect the occurrence of collision (S6, S7). Thereafter, the terminal 3 and the base station 1 retry the transmission of the data frames (S8, S9).

As explained above, there is a problem in that, when frame collision occurs, a terminal cannot retry the transmission until the time-out of the answer frame. Further, when the base station 1 performs a transmission operation during frame collision, the base station 1 cannot transmit the frame until detecting the non-communication time after the end of the colliding frames.

The present invention provides a system for controlling frame collision enabling the transmission retry earlier and the transmission of data frames from a base station earlier.

Figure 1:
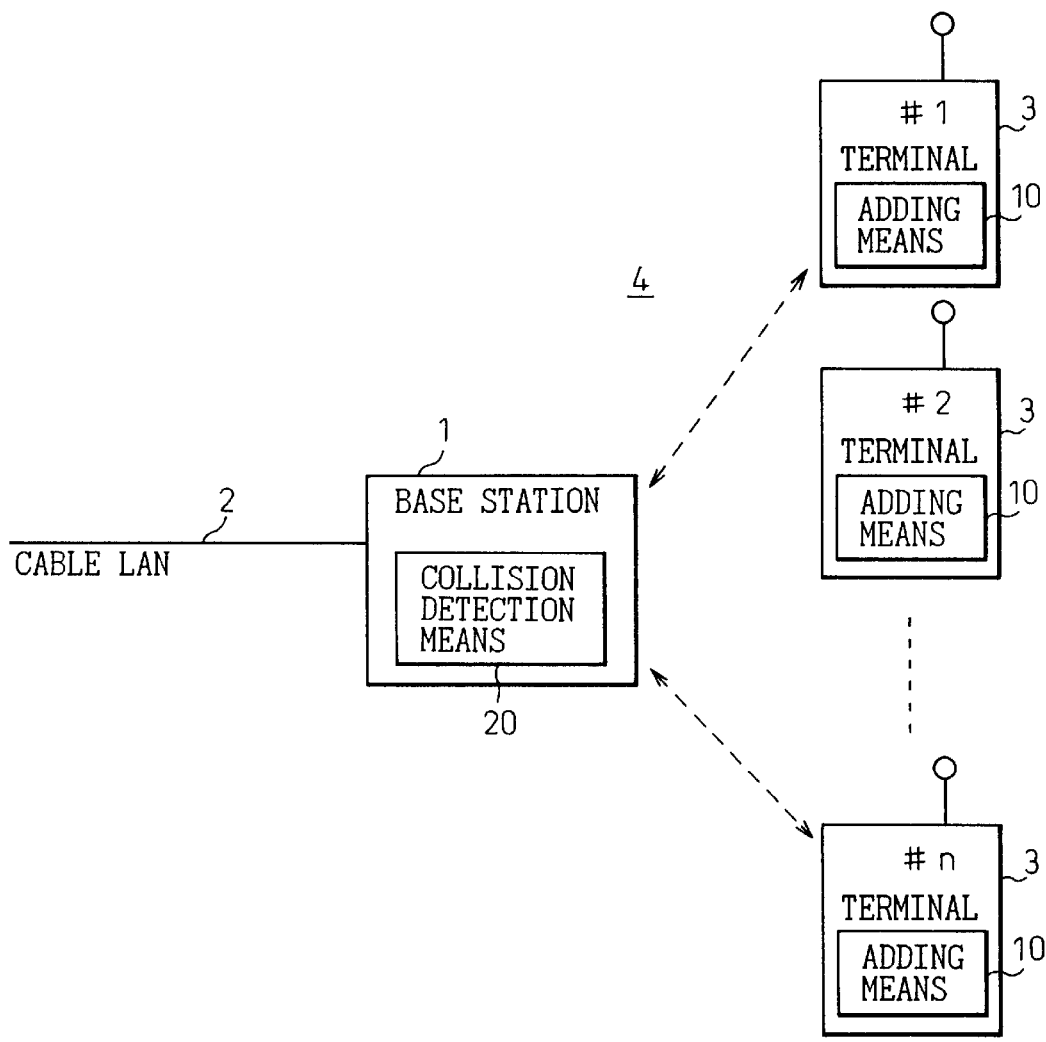
FIG. 1 is a principle configuration block diagram of the present invention.

FIG. 1 is a principle configuration block diagram of the present invention (first aspect). Elements the same as those of FIG. 12 are indicated by the same reference numerals. The system for controlling frame collision shown in the figure is a wireless LAN 4 constituted by a base station 1 connected to a cable LAN 2 and a plurality of terminals 3 performing radio communication with the base station 1. In the figure, a case where n number of terminals 3 are provided is shown, but any number may be provided.

In the terminal 3, 10 is an adding means for adding the frame start code and the length to the tail of the data frame to be transmitted from the terminal 3 to the base station 1. In the base station 1, 20 is a collision detection means for detecting the occurrence of collision when the frame start code and length remain without being destroyed in any of the data frames arriving simultaneously from a plurality of terminals 1.

According to the configuration of this invention, taking note of the fact that the lengths of frames of simultaneously colliding data frames are different, the base station 1 detects that the frame start code and the length remain in the longer frame among colliding data frames so as to detect the occurrence of collision of frame data and thereby can notify the corresponding terminal 3 of the occurrence of collision.

In a first preferred form of the first aspect of the invention, the base station 1 transmits a collision notifying frame addressed to the corresponding terminal 1 when the collision detection means 20 detects the collision of data frames.

According to the configuration of this invention, by rapidly transmitting the notification of the frame collision from the base station 1 to the terminal 3 side when detecting the data frame collision, the transmission retry operation of the terminal side can be made earlier.

In a second preferred form of the first aspect of the invention, when a transmission operation from the base station 1 to a terminal 3 occurs during data frame collision, the base station 1 starts the frame transmission immediately after the end of the colliding frames.

According to this configuration of the invention, immediately after the data frame collision, frame transmission can be commenced from the base station 1 and therefore data frame transmission from the base station 1 can be made earlier.

In a second aspect according to the present invention for achieving the above object, there is provided a system for controlling frame collision in a wireless LAN 4 constituted by a base station 1 connected to a cable LAN 2 and a plurality of terminals 3 for performing radio communication with the base station, wherein provision is made of an adding means for adding a frame start code and a length to the tail of a data frame to be transmitted from a terminal to the base station or from the base station to a terminal and provision is made of, at the base station or terminals, a collision detection means for recognizing an occurrence of collision when the frame start code and length remain in any data frame without being destroyed when data frames are simultaneously transmitted between the base station and terminals and collision occurs.

According to this configuration of the present invention, when a data frame transmitted from the base station 1 and a data frame transmitted from a terminal 3 collide, the base station and terminal can detect the occurrence of collision.

In a first preferred form of the second aspect of the invention, a terminal 3 detecting the collision retries transmission of the data frame immediately after the detection of collision.

According to this configuration of the present invention, since the terminal 3 retries the transmission of the data frame immediately after the detection of collision, the time until the transmission retry can be shortened.

In a second preferred form of the second aspect of the invention, the base station 1 detects that collision has occurred by receiving a data frame transmitted from a terminal 3.

According to this configuration of the present invention, the base station can detect the occurrence of collision by receiving a data frame from a terminal and referring to the content thereof.

In a third preferred form of the second aspect of the invention, the base station 1 detecting collision retries the transmission of a data frame immediately after the transmission of an answer frame to a terminal 3.

According to this configuration of the present invention, since the base station 1 can retry transmission of a data frame immediately after the transmission of an answer frame to a terminal 3, the time until the transmission retry is commenced can be shortened.

In a fourth preferred form of the second aspect of the invention, the base station 1 detecting the collision retries transmission of a data frame immediately after detection of collision.

According to this configuration of the present invention, since the base station 1 retries transmission of a data frame immediately after collision detection, the time until the transmission retry can be shortened.

In a fifth preferred form of the second aspect of the invention, a terminal 3 detects occurrence of collision by receiving a data frame transmitted from the base station 1.

According to this configuration of the present invention, a terminal 3 can detect occurrence of collision by receiving a data frame from the base station 1 and referring to the content thereof.

In a sixth preferred form of the second aspect of the invention, a terminal 3 detecting collision retries transmission of a data frame immediately after transmission of an answer frame to the base station 1.

According to this configuration of the present invention, since a terminal 3 retries transmission of a data frame immediately after the transmission of an answer frame to the base station 1, the time until the start of the transmission retry can be shortened.

Below, more specific embodiments of the present invention will be explained in detail by referring to the drawings.

First, the mode of operation of the present invention will be explained by using FIG. 2. Assume that the terminal A (3) and the terminal B (3) substantially simultaneously transmit data frames. Here, assume that a data frame is comprised by a first frame and a second frame. The terminal A and the terminal B perform the frame transmission by adding a second frame comprised by the start code and the length to the first frame by the adding means 10.

When data frames collide between the terminal A and the terminal B, the part destroyed due to the collision appears to the base station 1 like noise. The base station 1 performs an operation for reception of the noise, but ignores it since the data has been destroyed and consequently processes it as if nothing occurred. That is, at this point of time, the collision detection means 20 of the base station 1 does not decide there was a collision.

Thereafter, as shown in the figure, the base station 1 receives the part which did not collide in the data frame transmitted from the terminal B. This part contains at least all of the second frame. The second frame must contain the start code and the length. When the start code and the length are contained in the remaining frame part without superimposition of frames from any other terminal, the collision detection means 20 can detect the collision of frames. In this way, the present invention is predicated on collision occurring with a time relationship where the second frame part of any frame among colliding frames remains.

Figure 2:
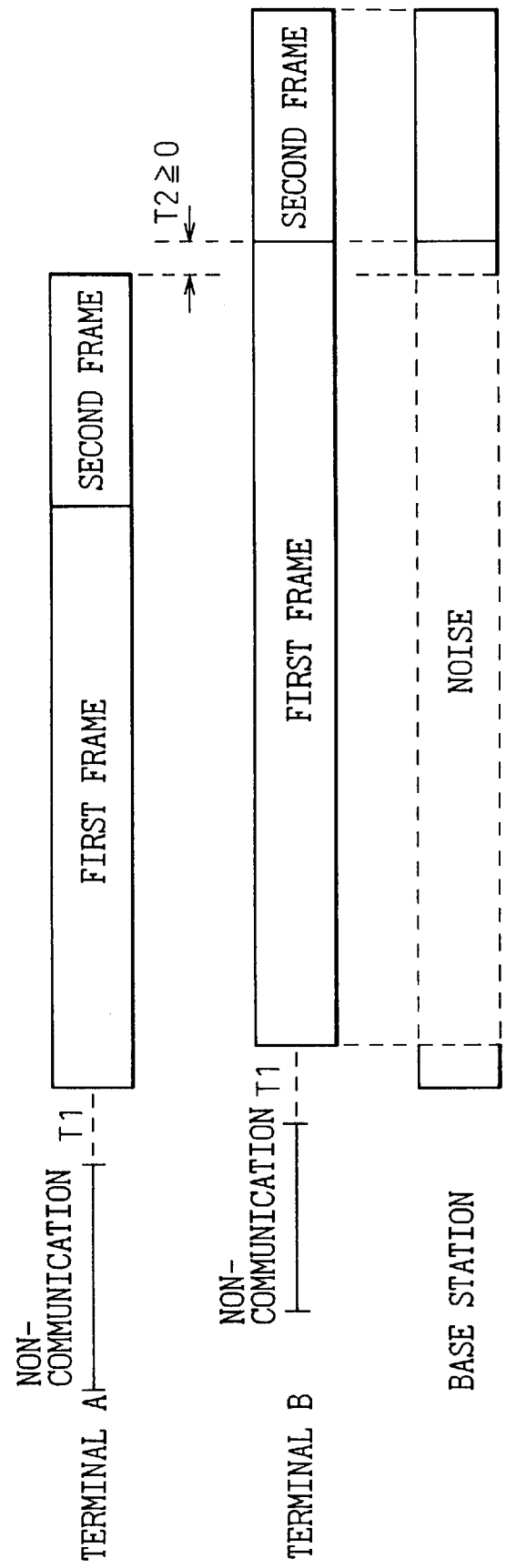
FIG. 2 is an explanatory view of a mode of operation of the present invention.

In the case of FIG. 2, the collision must occur at a timing where the second frame part of the terminal B is not superimposed on the frame of the terminal A. Namely, $T2 \geq 0$ indicated in the figure becomes the condition. T2 is a time from the end of the shorter frame to the head of the second frame of a longer frame.

In this way, according to the present invention, taking note of the fact that lengths of frames of simultaneously colliding data frames are different, the collision detection means 20 of the base station 1 detects that the frame start code and the length remain in the longer frame among colliding data frames so as to detect occurrence of collision of the frame data and can notify the corresponding terminal 3 of the occurrence of collision.

Figure 3:
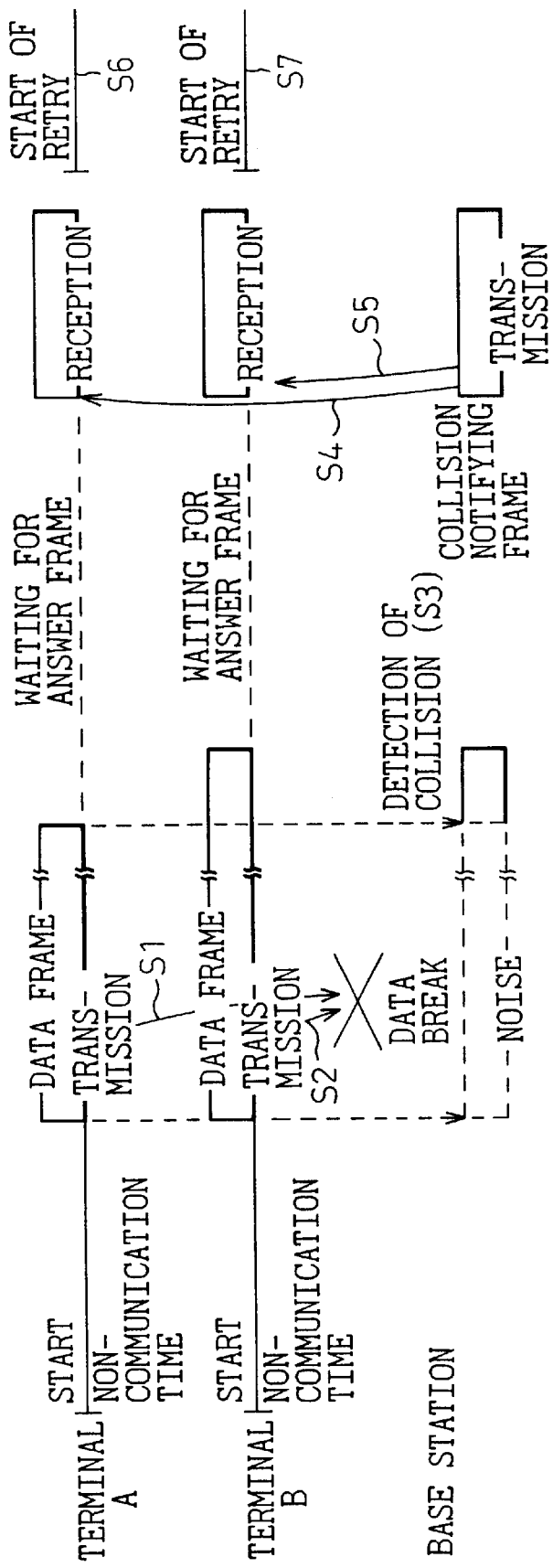
FIG. 3 is an explanatory view of an operation of a first embodiment of the present invention.

FIG. 3 is an explanatory view of the operation of the first embodiment of the present invention. The terminal A and the terminal B simultaneously start the transmission operation, detect the non-communication time, and transmit data frames (S1, S2). As a result of this, frame collision occurs, the frames (data) are destroyed, and the base station 1 recognizes them as noise. Immediately after the end of the collision of frames, the collision detection means 20 of the base station 1 recognizes that the start code and the length are contained in the remaining part of the frame from either of the terminals to detect the collision (S3).

When detecting the collision, the base station 1 next transmits collision notifying frames to the terminals 3 (S4, S5). The terminal A and the terminal B receive the collision notifying frames, recognize that the frame transmission failed due to the collision, and start the transmission retry from that point of time (S6, S7).

By this, the transmission retry can be started earlier than the system of the related art and performance can be improved.

Figure 4:
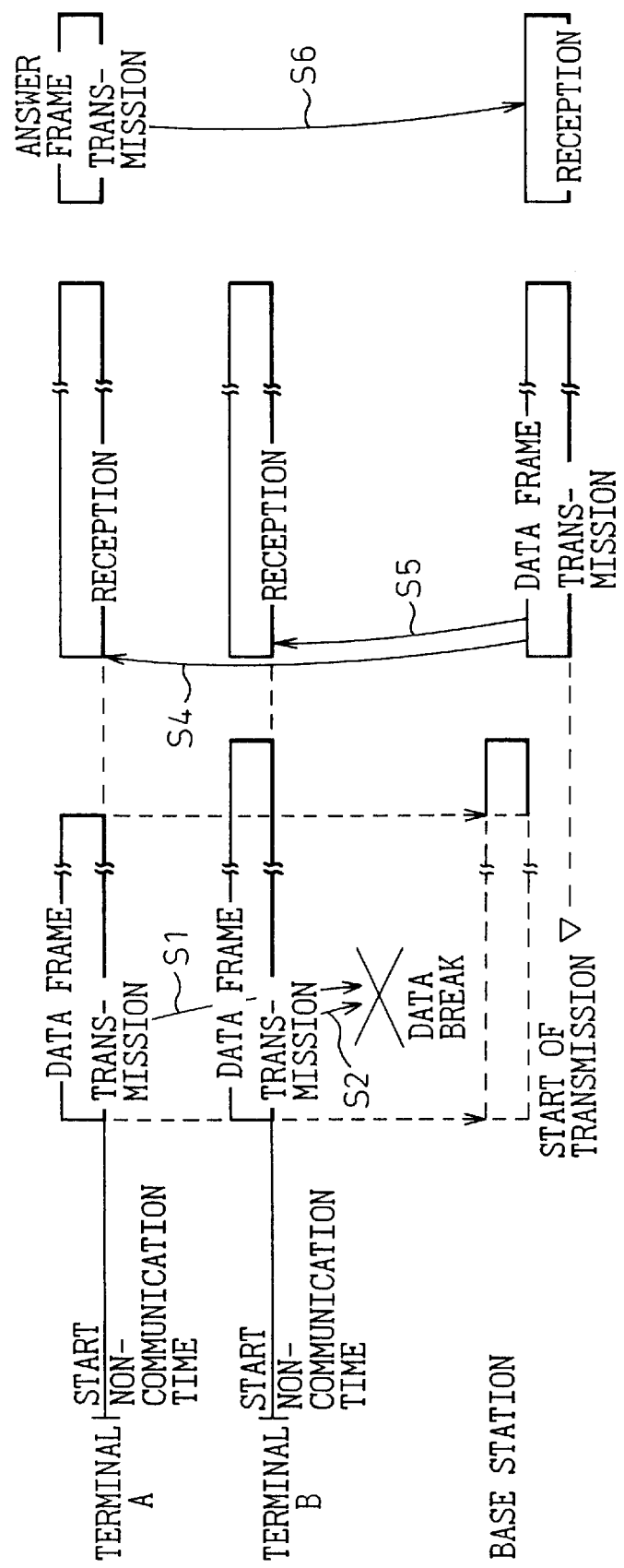
FIG. 4 is an explanatory view of the operation of a second embodiment of the present invention.

FIG. 4 is an explanatory view of the operation of a second embodiment of the present invention. In the same way as the case of FIG. 3, data frames from the terminal A and the terminal B collide (S1, S2). Assume that there is a request for transmission of a data frame from the base station 1 to a terminal 3 during this frame collision. During the collision, the collision detection means 20 of the base station 1 recognizes the frames as noise. For this reason, the transmission operation from the base station 1 is postponed.

Next, after the collision of frames ends, the collision detection means 20 detects the collision from the remaining data among the frames (S3). Then, after the detection of collision, the base station 1 transmits data frames to the terminal A and the terminal B (S4, S5). The terminal (here, A) receiving a data frame returns an answer frame to the base station 1 (S6).

According to this embodiment, immediately after the collision of data frames, transmission of a data frame can be commenced from the base station 1, so data frame transmission from the base station 1 can be made earlier.

FIGS. 5A and 5B are views showing examples of the configuration of the terminal side data frame and the collision notifying frame of the present invention. The same elements as those of FIG. 12 are indicated by the same reference numerals. FIG. 5A shows an example of the configuration of the data frame 5A transmitted from the terminal 3 side and received at the base station 1; while FIG. 5B shows an example of the configuration of the collision notifying frame 7 transmitted from the base station 1 side and transmitted to the terminal 3.

The terminal side data frame 5A is comprised by a first frame and a second frame. The first frame is comprised by a preamble 12, start code 13, length 14, data 15, and check code 16 and has the same configuration as that of the data frame of the related art shown in FIG. 12.

The second frame is comprised by a start code 21 and a length 22. The start code 21 is added immediately after the check code 16 of the first frame and has a content equivalent to that of the start code 13. The length 22 is added immediately after the start code 21, and "0" is stored.

When the base station 1 receives the terminal side data frame 5A, since there are start codes in both of the first frame and the second frame, it receives them as different frames. Namely, if the collision detection means 20 of the base station 1 receives one terminal side data frame 5A, this means that two frames of the first frame and the second frame are received. The first frame and the second frame can be differentiated according to the length. This is because the length of the first frame is other than "0", and the length of the second frame is "0".

The collision notifying frame 7 is a frame for notifying the occurrence of collision from the base station 1 to the terminal 3. The preamble 12, start code 13, and length 14 have the same frame configuration as that shown in FIG. 12. Reference numeral 25 is a collision occurrence code which indicates that the frame containing this code is a collision notifying frame.

FIG. 6 is an explanatory view of the operation of a third embodiment of the present invention and indicates the frame transmission operation from the terminal 3 to the base station 1 in a normal mode. The terminal 3 detects the non-communication time (S1), then transmits the terminal side data frame 5A to the base station 1 (S2). The base station 1 recognizes that the terminal side data frame 5A was normally received since the first frame and the second frame are normally received. Thereafter, the base station 1 transmits an answer frame to the terminal 3 (S3). The terminal 3 side receives the answer frame and ends the communication.

FIG. 7 is an explanatory view of the operation of a fourth embodiment of the present invention and indicates the operation of retry transmission by terminals at the time of collision of frames. The terminal A and the terminal B simultaneously start the transmission operation, detect the non-communication time, and transmit terminal side data frames 5A (S1, S2). As a result, on the base station 1 side, frame collision occurs, and the data is destroyed (S3). Thereafter, when the transmission of the terminal side data frame 5A from the terminal A is ended, the terminal side data frame 5A (second frame part) from the terminal B after that point of time does not collide, therefore the start code 21 and the length 22 ("0") are transmitted to the base station 1 (S4, S5).

At the base station 1 side, the collision detection means 20 does not receive the parts where the data is destroyed due to collision since it judges them to be noise, but recognizes the not colliding part as an available frame since it has the start code 21 and receives the start code 21 and the length 22. Here, the collision detection means 20 recognizes that these start code 21 and length 22 are the second frame since the length 22 is "0" and further detects the occurrence of collision in the first half part of this terminal side data frame 5A since it does not receive the first frame immediately before this (S6).

Thereafter, the base station 1 transmits the collision notifying frame 7 to the terminal A and the terminal B (S7, S8). The terminal A and the terminal B enter into the state waiting for an answer frame after the transmission of the terminal side data frames 5A, but receive the collision notifying frame 7 transmitted from the base station 1, therefore recognize that the transmitted terminal side data frames 5A were destroyed due to collision and retry the transmission immediately after this (S9, S10).

According to this embodiment, by rapidly notifying the collision of data frames from the base station 1 to the terminal 3 side, the transmission retry operation of the terminal 3 side can be made earlier.

Figure 8:
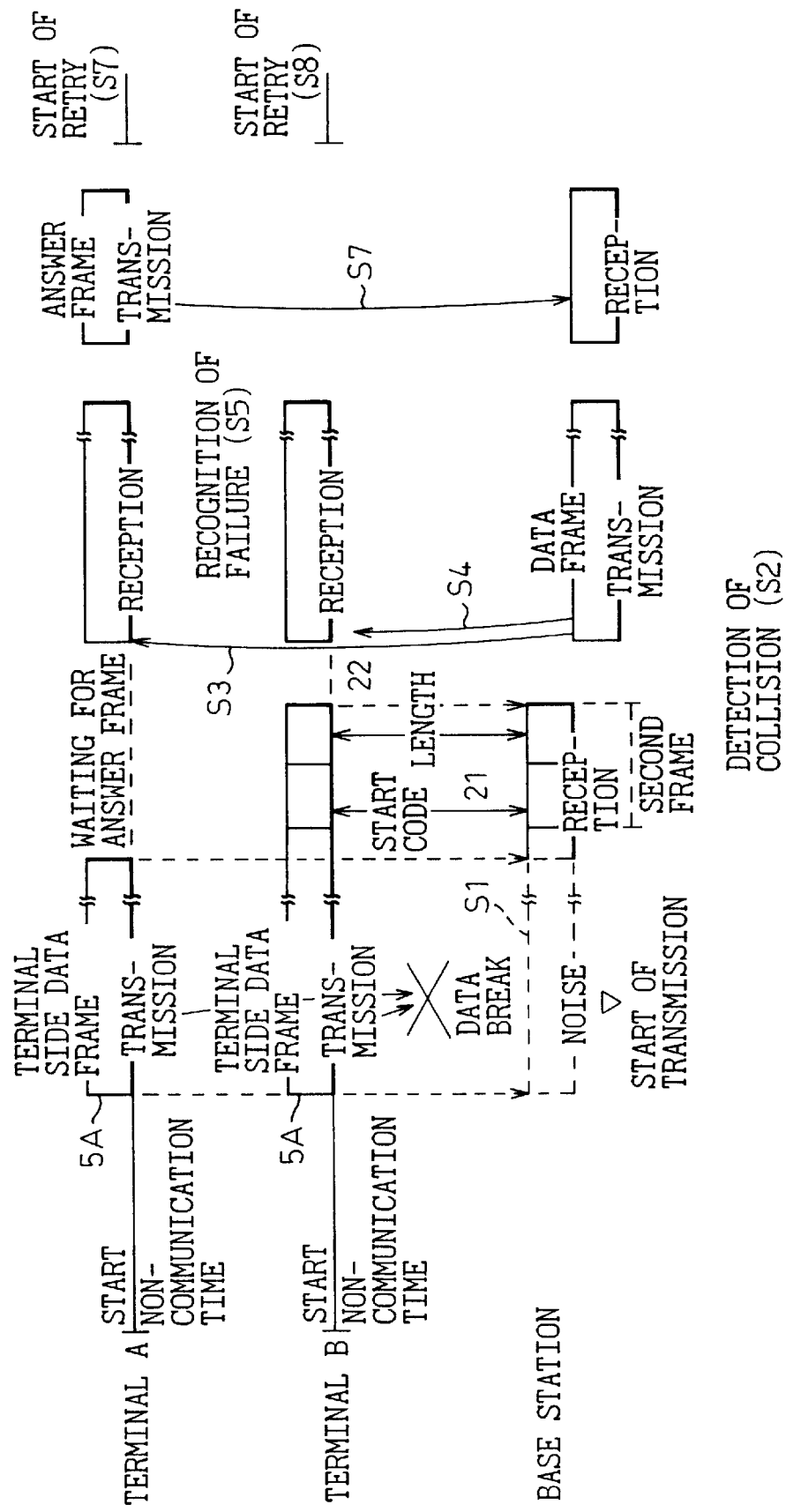
FIG. 8 is an explanatory view of the operation of a fifth embodiment of the present invention.

FIG. 8 is an explanatory view of the operation of a fifth embodiment of the present invention and shows the operation when the base station 1 starts, during the frame collision, the transmission of frame data to the terminal A. In this case, the base station 1 starts the transmission during the collision of the terminal side data frames 5A. Since the terminal side data frames 5A are colliding, the base station side recognizes them as noise and postpones the transmission (S1).

Thereafter, the collision detection means 20 of the base station 1 receives only the second frame without receiving the first frame from the terminal B and thereby detects the occurrence of collision (S2). There is no terminal performing transmission immediately after the occurrence of collision, therefore the base station 1 transmits a data frame immediately after the end of the terminal side data frame 5A from the terminal B (S3, S4).

The terminal A and the terminal B have entered a state waiting for an answer frame after the transmission of the terminal side data frames 5A, but recognize that the transmitted terminal side data frames 5A were destroyed due to the collision since they receive data frames transmitted from the base station 1. Here, the terminal A transmits an answer frame to the base station 1 (S6) since the received data frame is data addressed to itself (recognizes that it is addressed to itself from a destination ID added to the data). The base station 1 receives this answer frame and ends the communication. After this, the terminal A and the terminal B retry the transmission of the terminal side data frames 5A which failed to be transmitted due to the collision (S7, S8).

According to this embodiment, immediately after the data frame collision, frame transmission can be commenced from the base station 1, so data frame transmission from the base station 1 can be made earlier.

Figure 9:
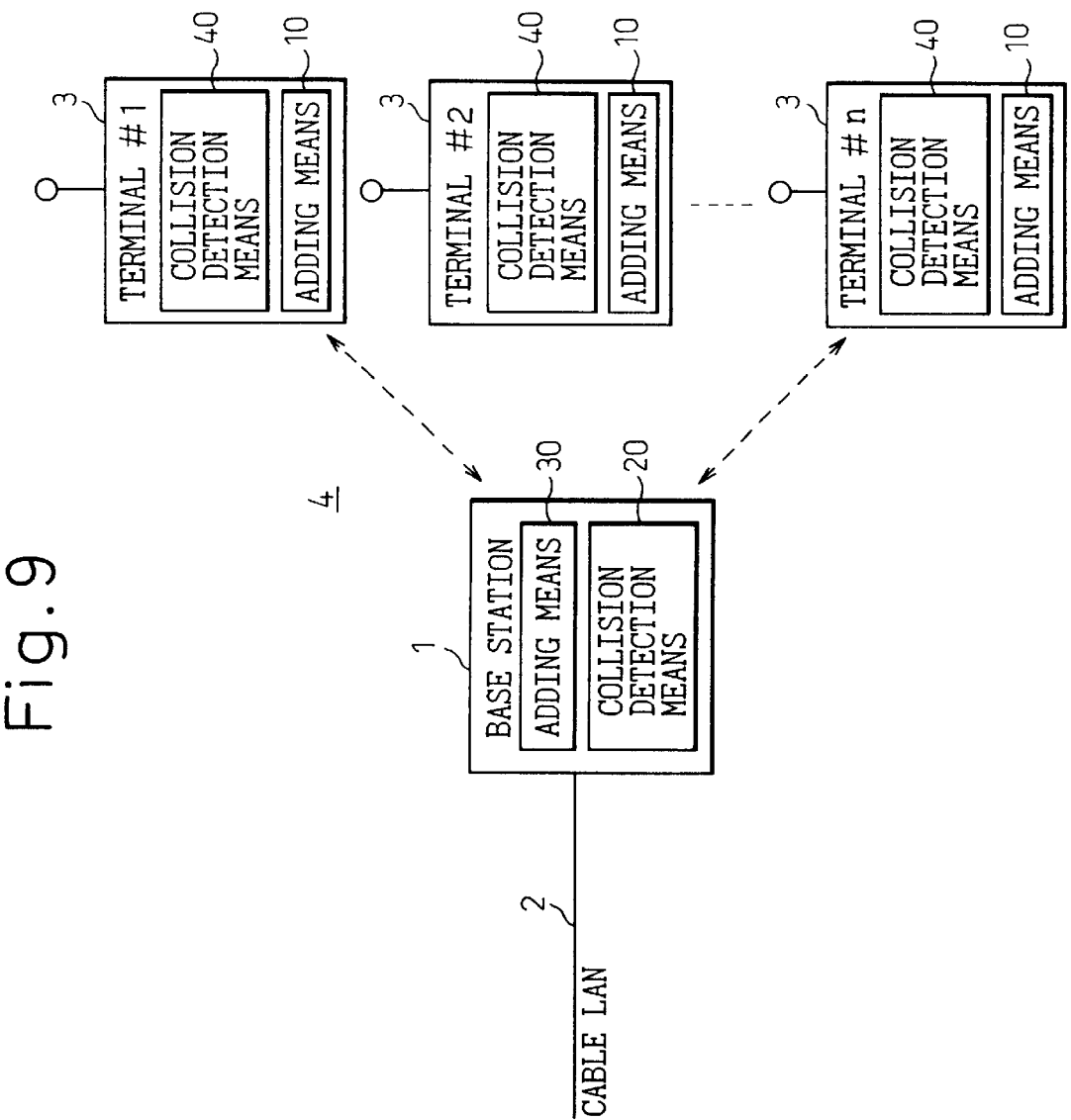
FIG. 9 is a principle configuration block diagram of a second aspect according to the present invention.

FIG. 9 is a block diagram of the second aspect of the present invention. Elements the same as those of FIG. 1 are indicated by the same reference numerals. In this invention, the adding means for adding the frame start code and the length to the tail of the data frame and the collision detection means for detecting the collision of data frames of the base station and terminals are provided in both of the base station 1 and terminals 3.

In the base station 1, reference numeral 30 is the adding means for adding the frame start code and the length to the tail of the data frame. At the terminal 3, reference numeral 40 is the collision detection means for detecting the occurrence of collision of data frames.

According to the structure of this invention, when the data frame transmitted from the base station 1 and the data frame transmitted from the terminal 3 collide, the base station 1 and the terminal 3 can detect the occurrence of collision.

Figure 10:
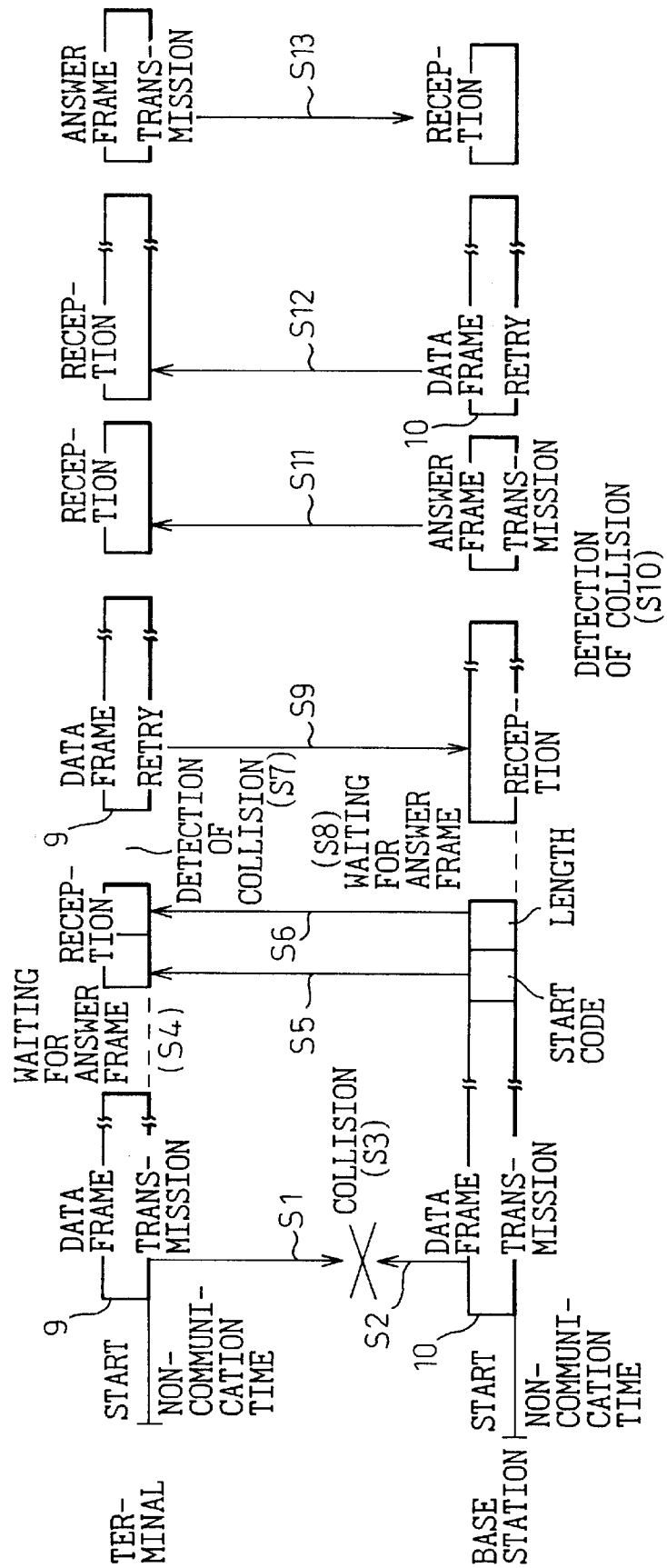
FIG. 10 is an explanatory view of the operation of an embodiment based on the second aspect.

FIG. 10 is an explanatory view of the operation of an embodiment based on the second aspect of the present invention. Here, an explanation will be made, regarding a length of each data frame from the terminal and the base station, for a case where the data frame from the terminal is shorter than the data frame from the base station. Here, the data frame transmitted from the terminal 3 is designated as a data frame 9, and the data frame transmitted from the base station 1 is designated as a data frame 10.

Both of the terminal and base station simultaneously start the transmission operation, detect the non-communication time, and transmit the data frame 9 and the data frame 10 (S1, S2). As a result, collision occurs (S3). Thereafter, since the data frame 9 from the terminal 3 ends earlier than the data frame from the base station 1, a state where the start code and the length of the latter half part of the data frame 10 from the base station remain in space is exhibited.

The terminal 3 enters into a state waiting for an answer frame (S4) after the transmission of the data frame, but receives the start code and length from the base station 1 (S5, S6), therefore recognizes that the transmission of the data frame 9 failed due to the occurrence of collision (S7). Note that the base station side enters into a state waiting for an answer frame after ending the transmission of the data frame 10 (S8).

The terminal 3 immediately retries the transmission of the data frame 9 (S9) when recognizing that the transmission of the data frame failed.

According to the above embodiment, the terminal 3 retries the transmission of the data frame immediately after the detection of the collision, therefore the time until the transmission retry can be shortened.

On the other hand, on the base station 1 side, when receiving the retry data frame 9 transmitted from the terminal 3, the base station 1 refers to the content thereof and can recognize the occurrence of the collision (S10). The base station 1 enters into a state waiting for an answer frame after the transmission of the data frame 10 (S8), but receives the transmitted data frame 9 due to the retry from the terminal 3, therefore recognizes that the transmission of the data frame 10 failed due to the occurrence of collision. Thereafter, it transmits an answer frame to the terminal (S11) and then retries the transmission of the data frame 10 (S12).

According to the above embodiment, immediately after the transmission of the answer frame to the terminal 3, the base station 1 retries the transmission of the data frame, therefore the time until the transmission retry is commenced can be shortened.

The terminal 3 receives the answer frame from the base station 1 (S11) and ends the transmission operation of the data frame 9. Thereafter, it receives the data frame 10 from the base station 1 (S12) and transmits an answer frame with respect to this (S13). The base station 1 receives the answer frame from the terminal 3 and ends the transmission operation of the data frame 10.

In the above embodiment, an explanation was made of a case where the data frame of the terminal is shorter than the data frame of the base station, but the operation is similar in a case where the data frame of the base station is shorter than that of the terminal except that the operations of the terminal and the base station become reverse.

In this way, according to the second aspect of the present invention, detection of collision at the terminal and the base station is possible without waiting until the time-out and the performance can be improved by the shortening of the transmission retry start time.

Figure 11:
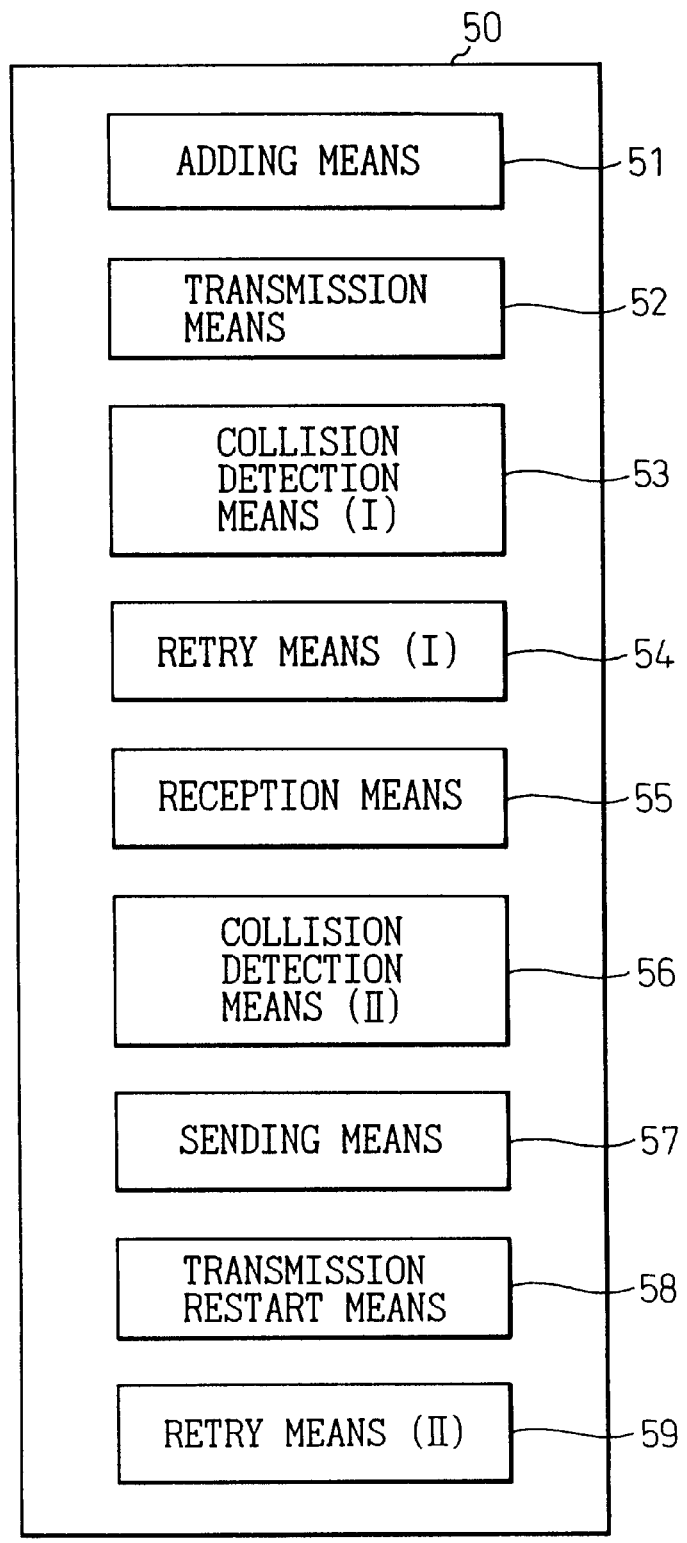
FIG. 11 is a principle configuration block diagram of communication equipment based on the present invention.

FIG. 11 is a block diagram of communication equipment based on the present invention. Both of the base station and terminals mentioned above can be realized as communication equipment provided with the frame collision control function. FIG. 11 shows all of the constituent elements which can be contained in this communication equipment. The communication equipment of the base station is constituted by a combination of the required constituent elements among the illustrated constituent elements. The communication equipment of the terminal is also constituted by a combination of required constituent elements among the illustrated constituent elements.

This will be explained by referring to FIG. 11.

This communication equipment performs communication between at least two equipment. The communication equipment 50 has the following constituent elements.

Reference numeral 51 indicates the adding means for adding the collision occurrence recognition frame to the tail of the data frame to be transmitted to the other communication equipment, while reference numeral 52 is a transmission means for transmitting the data frame added with the collision occurrence recognition frame to the other communication equipment.

The collision occurrence recognition frame is comprised by at least the frame start code and the length.

Reference numeral 53 is the collision detection means (I) for detecting the occurrence of collision by receiving the data frame transmitted from the other communication equipment.

Reference numeral 54 is a retry means (I) for retrying transmission of a data frame after transmitting an answer frame in response to a data frame transmitted from another communication equipment.

Reference numeral 55 is a reception means for receiving the collision occurrence recognition frame transmitted added to the data frame by other communication equipment, and reference numeral 56 is a collision detection means (II) for recognizing that the collision occurs when the collision occurrence recognition frame remains without being destroyed even though the data frame collides with another data frame.

Reference numeral 57 is a sending means for sending a collision notifying frame addressed to the other communication equipment when the collision detection means detects the collision of data frames.

Reference numeral 58 is a transmission restart means for starting the frame transmission immediately after the end of the collision frames when the collision detection means detects the collision of data frames in a case where there is a frame transmission operation during the collision of data frames.

Reference numeral 59 is a retry means (II) for retrying transmission of the data frame addressed to the other communication equipment when the collision detection means 56 detects the collision of data frames.

As explained in detail above, according to the first aspect of the present invention, in a wireless LAN constituted by a base station connected to a cable LAN and a plurality of terminals for performing radio communication with the base station, provision is made of the adding means for adding a frame start code and length to the tail of the data frame to be transmitted from a terminal to the base station and the base station is provided with a collision detection means for recognizing the occurrence of collision when the frame start code and length remain without being destroyed in any of the data frames arriving simultaneously from a plurality of terminals, taking note of the fact that lengths of frames of simultaneously colliding data frames are different, the base station 1 can detect that the frame start code and the length remain in the longer frame between colliding data frames to detect that the collision of the frame data occurs and can notify the occurrence of collision to the corresponding terminal.

In this case, by enabling the base station to transmit a collision notifying frame addressed to the corresponding terminal when the collision detection means detects the collision of data frames, the transmission retry operation of the terminal side can be made earlier.

Further, when a transmission operation from the base station to a terminal occurs during data frame collision, by enabling the base station to start the frame transmission immediately after the end of the colliding frames, data frame transmission from the base station can be made earlier.

In this way, according to the present invention, a system for controlling frame collision enabling retry of transmission earlier and transmission of a data frame from the base station earlier can be provided.

According to a second aspect of the present invention, in a wireless LAN constituted by a base station connected to a cable LAN and a plurality of terminals for performing radio communication with the base station, provision is made of an adding means for adding a frame start code and a length to the tail of a data frame to be transmitted from a terminal to the base station and provision is made of, at the base station, a collision detection means for recognizing an occurrence of collision when the frame start code and length remain in any data frame without being destroyed when data frames are simultaneously transmitted between the base station and terminals and collision occurs, the base station and terminal can detect the occurrence of collision when a data frame transmitted from the base station and a data frame transmitted from a terminal collide.

In this case, by enabling a terminal detecting the collision to retry transmission of the data frame immediately after the detection of collision, the time until the transmission retry can be shortened.

Further, the base station can detect the occurrence of collision by receiving a data frame transmitted from a terminal and referring to the content thereof.

Further, by enabling the base station detecting collision to retry the transmission of a data frame immediately after the transmission of an answer frame to a terminal, the time until the transmission retry is commenced can be shortened.

Further, by enabling the base station detecting the collision to retry transmission of a data frame immediately after detection of collision, the time until the transmission retry is commenced can be shortened.

Further, it is made possible for a terminal to detect occurrence of collision by receiving a data frame transmitted from the base station and referring to the content thereof.

Further, by enabling a terminal detecting collision to retry transmission of a data frame immediately after transmission of an answer frame to the base station, the time until the start of the transmission retry can be shortened.

In this way, according to the present invention, a system for controlling frame collision enabling retry of the transmission earlier and transmission of the data frame from the base station earlier can be provided.

What is claimed is:

1. A system for controlling frame collision of data frames in a wireless network constituted by a base station connected to a cable network and a plurality of terminals for performing radio communication of data frames with the base station, with each data frame comprising first and second subframes, the system comprising:

a plurality of terminals, each provided with an adding unit adding the second subframe, comprising a frame start code and length, to a tail of the first subframe, and transmitting the first and second subframes from each terminal to the base station; and a base station provided with a collision detection unit recognizing the occurrence of a collision by detecting that only the second subframe remains, without being destroyed, in any data frames transmitted from the plurality of terminals and a collision occurs therebetween, wherein the base station transmits a collision notifying frame addressed to a corresponding terminal when the collision detection unit detects the collision of data frames.

2. A system for controlling frame collision as set forth in claim 1, wherein when a transmission operation from the base station to a terminal occurs during data frame collision, the base station starts frame transmission immediately after an end of colliding frames.

3. A system for controlling frame collision in a wireless network constituted by a base station connected to a cable network and a plurality of terminals for performing radio communication of data frames with the base station, with each data frame comprising first and second subframes, each of the base station and the plurality of terminals comprising:

an adding unit adding the second subframe, comprising a frame start code and a length, both for recognizing an occurrence of collision, to the tail of the first subframe when data frames are transmitted from a terminal to the base station or from the base station to a terminal; and a collision detection unit located at the base station or one of the terminals, the collision detection unit recognizing an occurrence of a collision by detecting that only the second subframe remains in any received data frames, without being destroyed, when data frames are simultaneously transmitted between the base station and terminals and the collision occurs.

4. A system for controlling frame collision as set forth in claim 3, wherein a terminal detecting the collision retries transmission of the data frame immediately after the detection of the collision.

5. A system for controlling frame collision as set forth in claim 4, wherein the base station detects occurrence of the collision by receiving a data frame from a terminal.

6. A system for controlling frame collision as set forth in claim 5, wherein the base station after a collision is detected retries transmission of a data frame immediately after transmission of an answer frame to a terminal.

7. A system for controlling frame collision as set forth in claim 3, wherein the base station after detecting the collision retries transmission of a data frame.

8. A system for controlling frame collision as set forth in claim 7, wherein a terminal detects occurrence of the collision by receiving the data frame transmitted from the base station.

9. A system for controlling frame collision as set forth in claim 8, wherein a terminal after detecting the collision retries transmission of the data frame immediately after transmission of an answer frame to the base station.

10. A communication equipment for performing communication of data frames between at least two equipment, with each data frame comprising first and second subframes, with one communication equipment comprising:

an adding unit adding the second subframe to a tail of the first subframe to be transmitted to other communication equipment; and a transmission unit transmitting said first subframe added with said second subframe to said other communication equipment, so that said other communication equipment detects a collision by detecting that only the second subframe remains, without being destroyed, during a collision.

11. Communication equipment as set forth in claim 10, further comprising a collision detection unit detecting occurrence of a collision by receiving the second subframe transmitted from said other communication equipment to said one communication equipment.

12. Communication equipment as set forth in claim 11, further comprising a retry unit retrying transmission of the first subframe after transmitting an answer frame in response to the second subframe transmitted from said other communication equipment to said one communication equipment.

13. Communication equipment as set forth in claim 10, wherein, the second subframe is comprised by at least a frame start code and a length.

14. Communication equipment as set forth in claim 10, wherein said other communication equipment is connected to a cable network.

15. Communication equipment for performing communication of data frames between at least two equipment, with each data frame comprising first and second subframes, comprising:

a reception unit receiving the second subframe added to the first subframe, transmitted by another communication equipment; and a collision detection unit recognizing that a collision occurs by detecting that only the second subframe remains, without being destroyed, in any received data frame even if the received data frame collides with another data frame.

16. Communication equipment as set forth in claim 15, further comprising a sending unit sending a collision notifying frame addressed to the other communication equipment when said collision detection unit detects collision of data frames.

17. Communication equipment as set forth in claim 15, further comprising a transmission restart unit starting transmission of a data frame immediately after an end of colliding frames when said collision detection unit detects collision of data frames where a data frame transmission operation occurs during collision of data frames.

18. Communication equipment as set forth in claim 15, further comprising a retry unit retrying transmission of a data frame addressed to another communication equipment when said collision detection unit detects collision of data frames.

19. Communication equipment as set forth in claim 15, wherein, said second subframe is comprised of at least a frame start code and a length.

20. Communication equipment as set forth in claim 15, wherein said communication equipment is connected to a cable network.

* * * * *